Sept. 3, 1946.                C. M. SAVRDA                2,406,907
              METHOD AND APPARATUS FOR TREATING FISH
                   Filed March 8, 1944         5 Sheets-Sheet 1
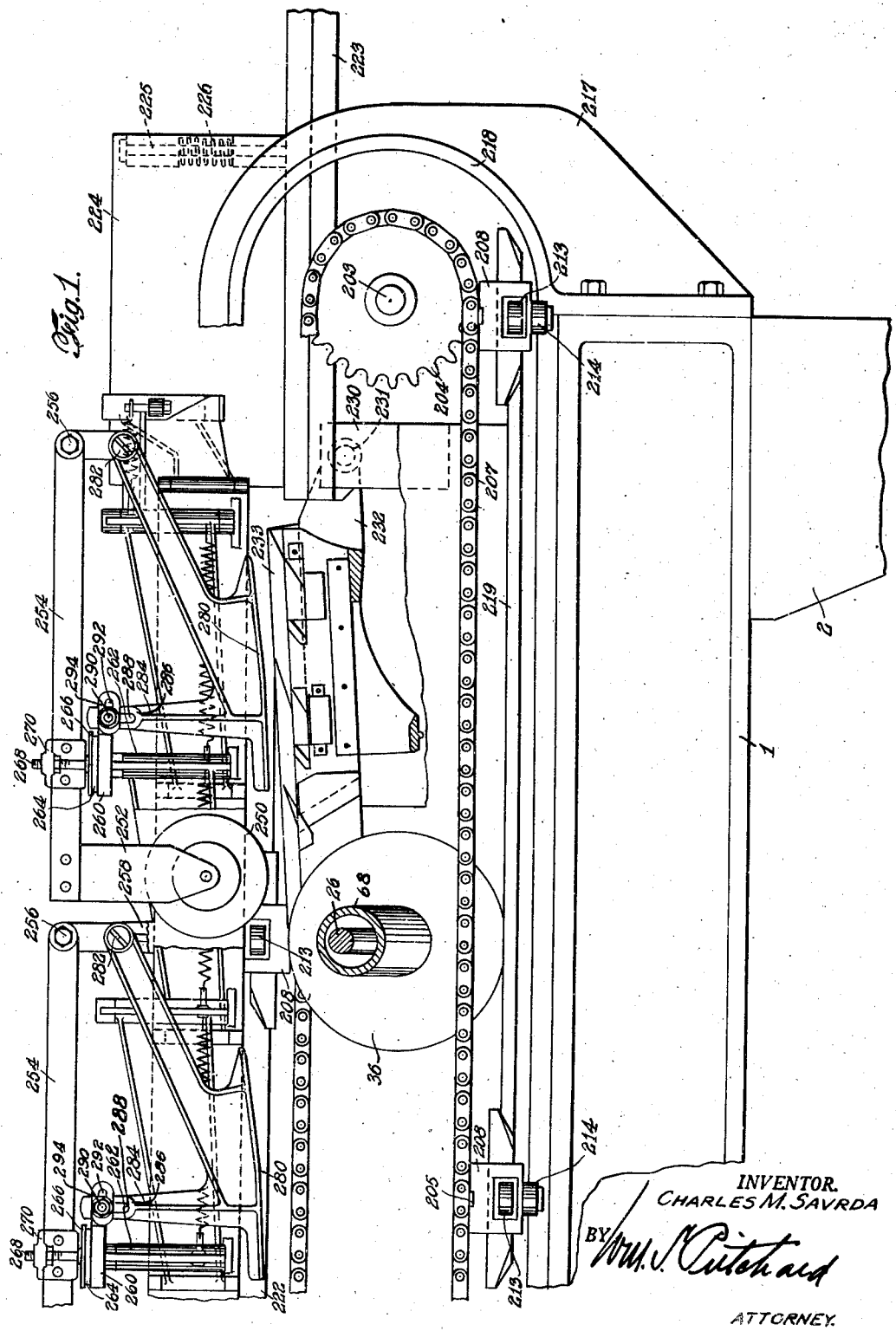
INVENTOR.
CHARLES M. SAVRDA
BY
ATTORNEY.

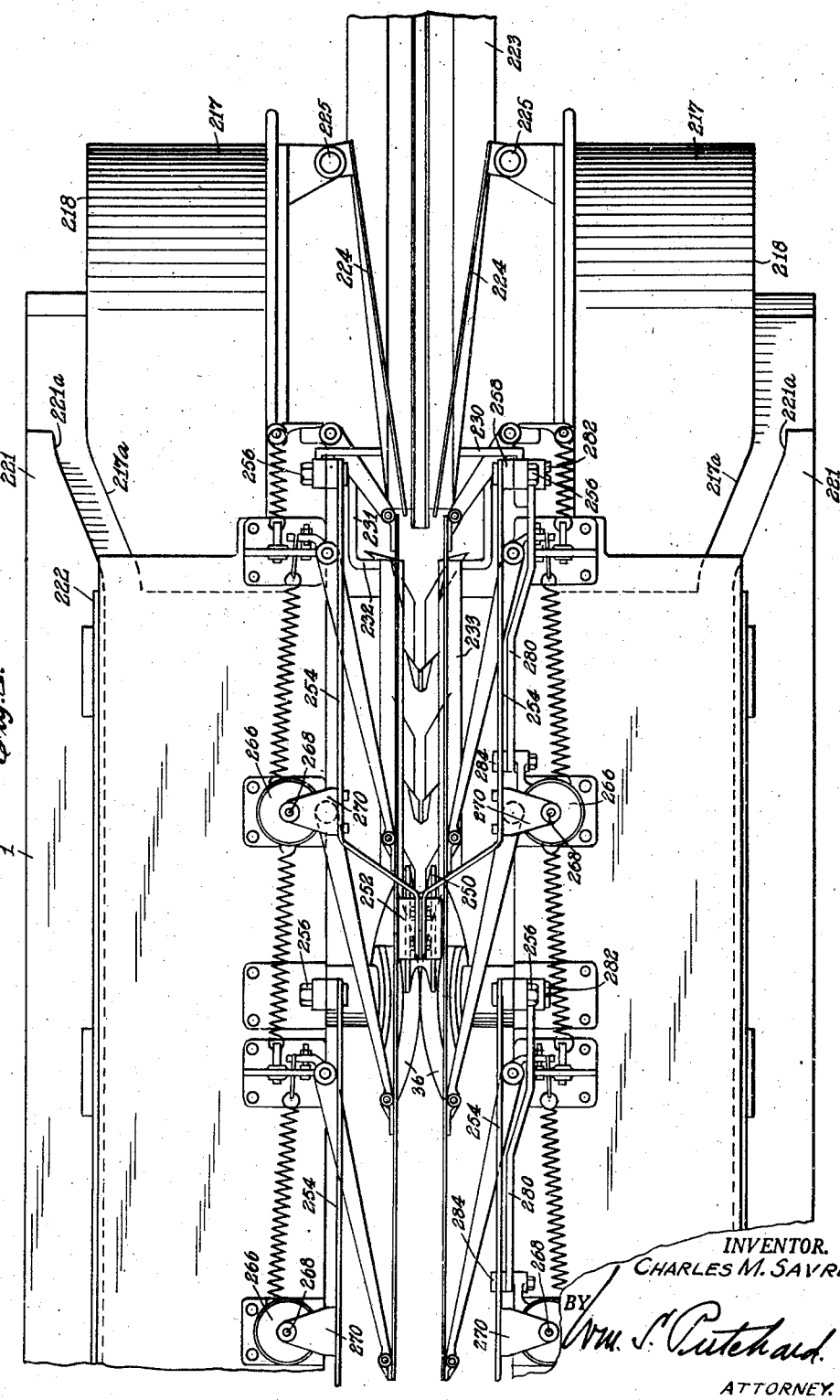

Sept. 3, 1946.　　　　C. M. SAVRDA　　　　2,406,907
METHOD AND APPARATUS FOR TREATING FISH
Filed March 8, 1944　　　　5 Sheets-Sheet 3
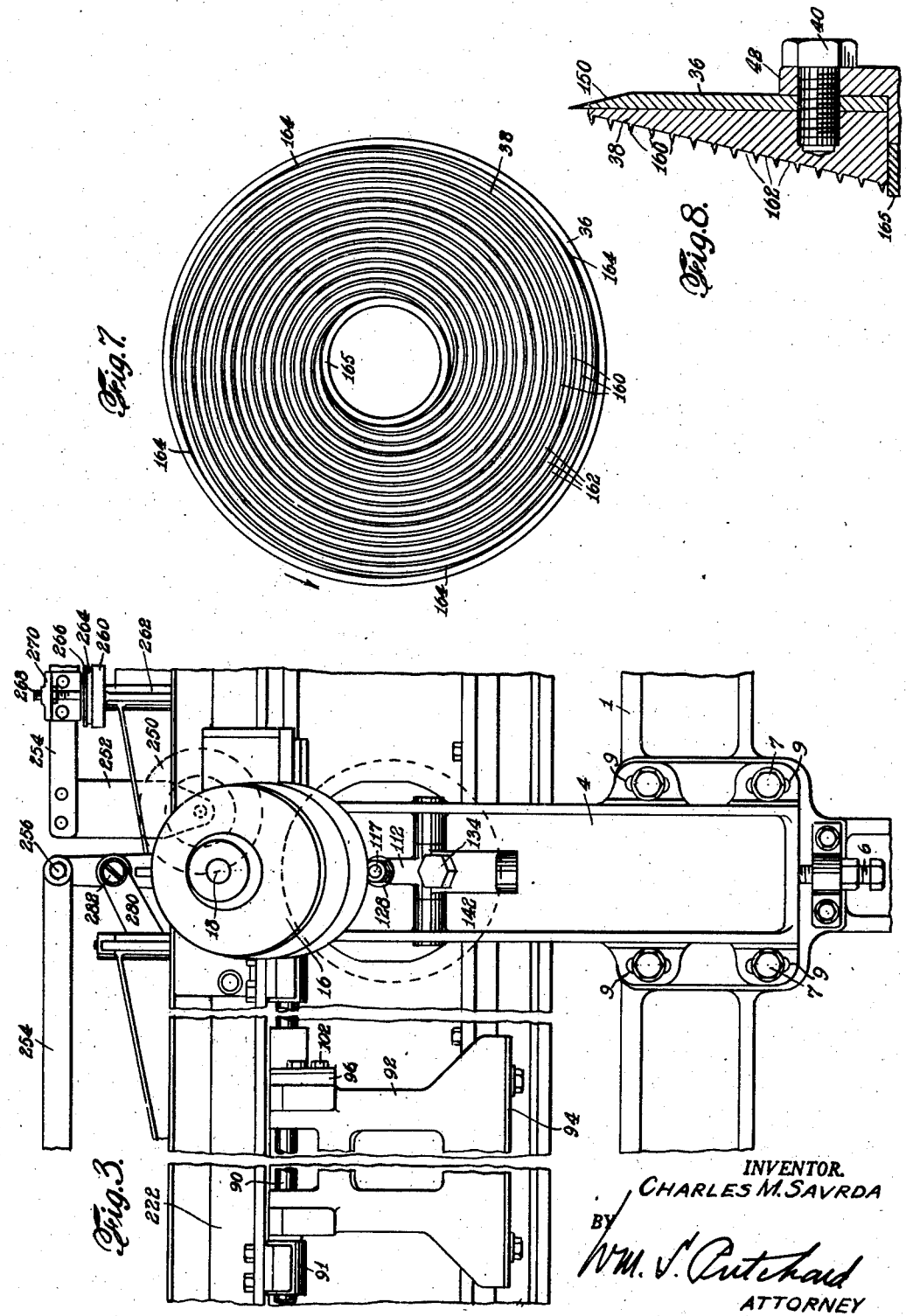
INVENTOR.
CHARLES M. SAVRDA
BY
Wm. S. Pritchard
ATTORNEY

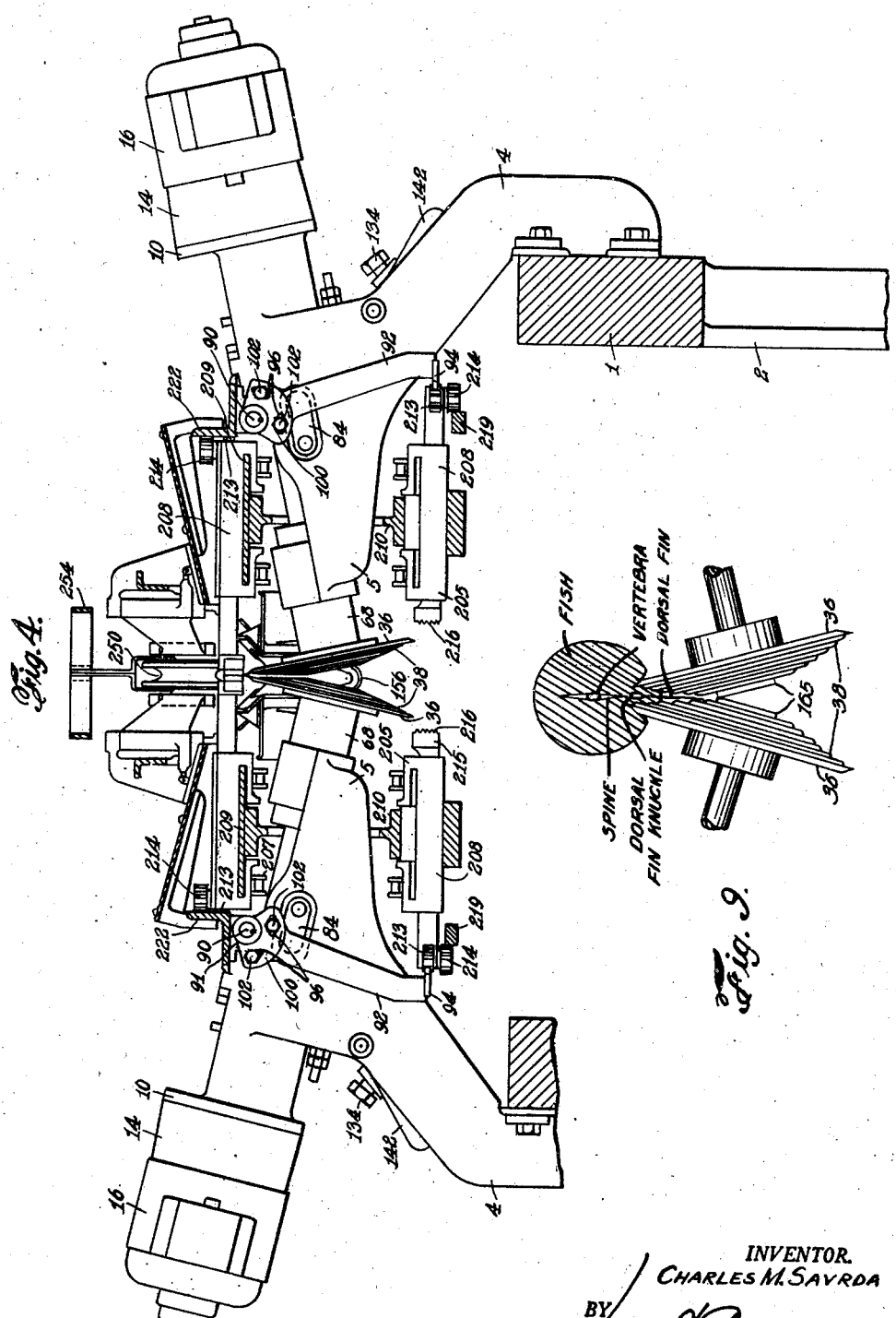

Sept. 3, 1946.  C. M. SAVRDA  2,406,907
METHOD AND APPARATUS FOR TREATING FISH
Filed March 8, 1944  5 Sheets-Sheet 5
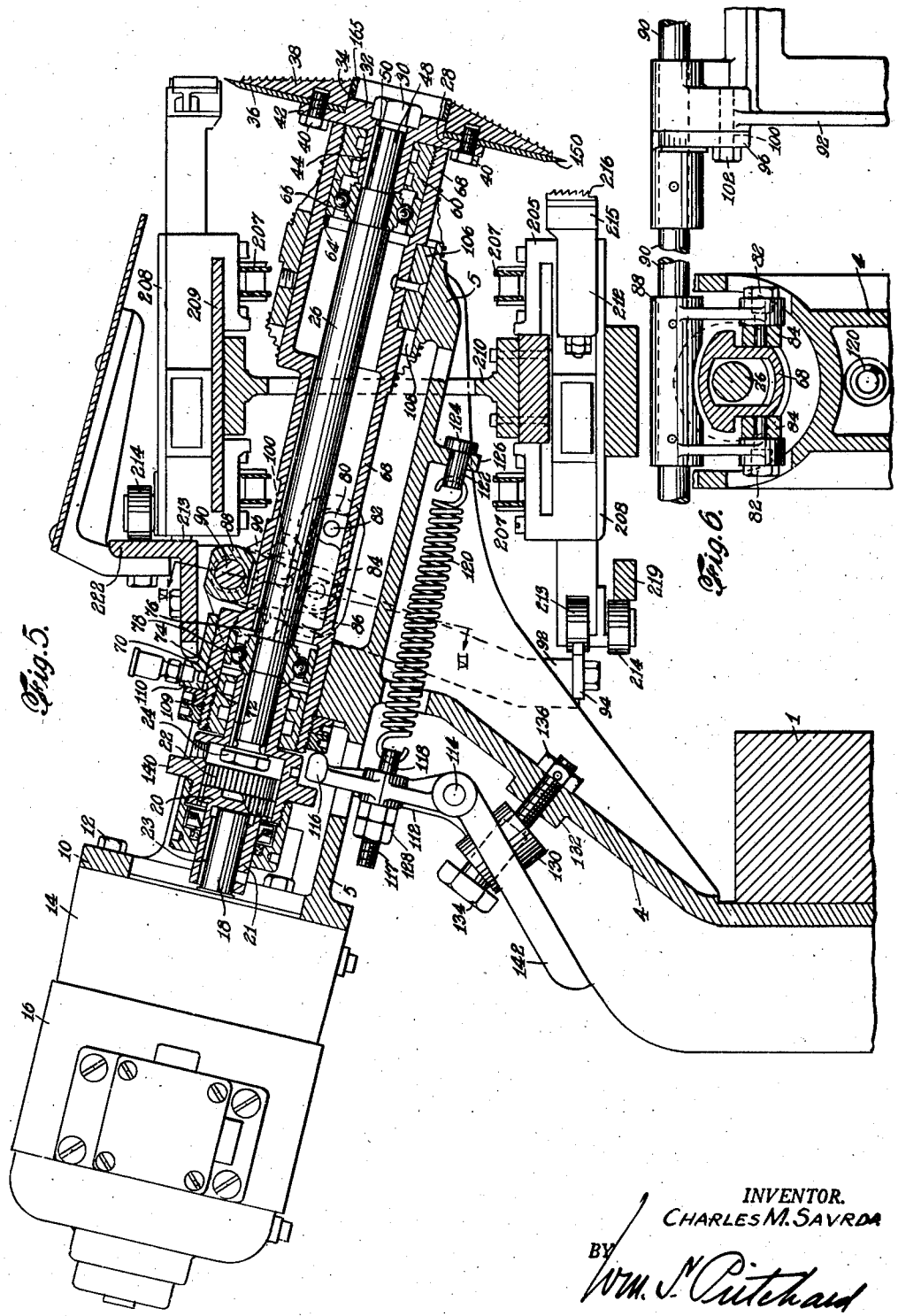
INVENTOR.
CHARLES M. SAVRDA
BY
Wm. S. Pritchard
ATTORNEY.

Patented Sept. 3, 1946

2,406,907

UNITED STATES PATENT OFFICE 2,406,907

METHOD AND APPARATUS FOR TREATING FISH

Charles M. Savrda, Bay Shore, N. Y., assignor to The Atlantic Coast Fisheries Company, New York, N. Y., a corporation of Maine Application March 8, 1944, Serial No. 525,546

13 Claims. (Cl. 17—3)

This invention relates to a method and apparatus for preparing fish for filleting. More particularly, it relates to a method of and apparatus for removing the dorsal fins and associated knuckles from fish.

United States Patent No. 2,137,291 discloses an apparatus for removing the dorsal fins and associated knuckles, capable of use as an attachment or in combination with a fish filleting machine of the type disclosed in United States Patent No. 2,149,021. In the illustrative embodiment disclosed in United States Patent No. 2,137,291, there is provided a pair of circular rotatable knives positioned to converge in the upward direction and to project into the path of movement of a fish as it moves thereover. Each of the knives has secured on its inner face adjacent the periphery in equally spaced positions a series of smooth or roughened gripper blocks. In the operation of such apparatus, as the fish moves into the range of action of the circular knives, their cutting edges at the very top engage the fish at the base of the tail at its back and begin to make converging cuts along the back. This partially cuts out a triangular strip of flesh directly along the longitudinal axis of the fish and on the opposite sides of the dorsal fins. By reason of the positioning of the circular knives, the gripping blocks, as they travel to the high point of their circular path, move toward each other. Thus, they grip between them the thin strip of flesh which is being cut from the back of the fish and pull or strip it from the fish, breaking it loose along the narrow point of attachment. The circular knives continue their cut throughout the length of the fish, with the gripping blocks breaking the strip of flesh loose.

In the just described mechanism, the gripping blocks intermittently grip the flesh and hold it for a relatively short period of time, thereby intermittently and for a relatively short period of time effecting the pulling and stripping action. During operation, the blocks as they move to the high point of their circular path sometimes kick the fish upwardly and thereby miss gripping the strip of flesh.

An object of this invention is to provide a new and improved method and apparatus for removing the dorsal fins and associated knuckles from fish preparatory to filleting.

Another object of this invention is to provide means to seize and continuously hold and pull the strip of flesh with the dorsal fins and knuckles attached thereto until the entire strip is removed from the fish.

Another object of this invention is to provide a new and improved drive mechanism for the rotary knives and means associated therewith for continuously holding and pulling the strip of flesh defined by the incisions made by the knives.

Other objects of the invention will become apparent hereinafter.

The above objects are, in general, accomplished by a pair of circular rotatable knives positioned so as to make converging incisions on opposite sides of the dorsal fins in the back of a fish, each knife being provided on its inner face with a scroll having a spiral rib, preferably sharpened to constitute a cutting edge, and a helical groove. The helical groove is provided with a plurality of lead-in ends adjacent the outer periphery thereof, whereby the strip of flesh, defined by the incisions made by the knives, will upon engaging one of the lead-in ends be caused to enter the helical groove between the spiral ribs in one or both of the scrolls, particularly when the knives and scrolls are moved toward each other. The dorsal fins are gripped and held by the spiral ribs and the knuckles are caused to enter the helical groove. The scrolls, when the knives are moved toward each other, mill the skin between the incisions. As the operation continues, the strip together with the fins and associated knuckles seized by the scrolls are, due to the rotation of the scrolls, caused to advance downwardly and are thereby placed and held under tension (downward). This action continues until the fish reaches the decapitated end, at which time the strip containing the dorsal fins and associated knuckles is removed.

Due to the fact that the circular knives are disposed in an upwardly converging direction, the scrolls are made of a conical shape so that, in position in the apparatus, the upper portion of each scroll will be disposed in a substantially vertical direction and parallel to the other.

Each circular knife, together with the scroll associated therewith, is driven from a motor by a drive mechanism and is adapted to be intermittently moved toward and away from the other circular knife and scroll at predetermined times, as more fully hereinafter explained.

Means are also provided to position the decapitated fish, back downward and tail leading, and to feed the fish in such position through the zone of action of the circular knives. To insure contact between the fish and the circular knives, hold-down means are also provided.

The apparatus for removing the dorsal fins and associated knuckles constituting one phase of this invention is capable of use as a separate machine or in combination with a fish filleting machine, for example of the type disclosed in United States Patent No. 2,149,021.

The specific details of the invention will now be described in connection with the drawings wherein an illustrative embodiment thereof is shown and wherein:

Figure 1 is a view of the mechanism, partly in section and partly in side elevation, with some parts broken away for clarity;

Figure 2 is a top view thereof;

Figure 3 is a side elevation of the dorsal fin-removing mechanism;

Figure 4 is an end elevation looking to the left of Figure 3, some of the parts being omitted for purpose of clarity;

Figure 5 is a vertical section of one-half of the dorsal fin-removing mechanism to show the details of construction thereof;

Figure 6 is a section taken on line VI—VI of Figure 5;

Figure 7 is a front elevation of a scroll;

Figure 8 is a partial, enlarged section of the knife and scroll assembly; and

Figure 9 is a (exaggerated) partial end elevation showing the relationship between a fish and the cutters with a portion of the cut strip engaged in the scrolls.

Referring now to the drawings wherein like reference numerals designate like parts, the reference numerals 1 and 2 designate the side members and legs respectively of the frame on which the apparatus constituting this invention is mounted. As shown in the drawings, on each side member 1 there is mounted a casting 4 which is provided at the top thereof with an integral, downwardly inclined housing 5. The casting 4 may be vertically adjusted by the adjusting screw 6 and locked into the adjusted position by screws 7 cooperating with slots 9. Since the specific details of each of the mechanisms associated with and carried by each of the castings 4 and the housings 5 are the same, for convenience only one of such mechanisms will be described herein.

At one end, the housing 5 is provided with a flange 10 which is secured by means of bolts 12 to a supporting ring 14 of a motor 16. The motor shaft 18 is provided with a gear 20 which meshes with an internal gear 22 secured by a bolt 24 to one end of a shaft 26. The gear is provided with a hub 21 which is keyed to the motor shaft 18 by a key 23. On the opposite end of the shaft 26, a knife holder 28 is secured to the shaft 26 by means of a bolt 30. The front of the knife holder 28 is provided with an annular flange 32 which extends through a central bore 34 of a circular knife 36, and also extends into a central aperture of a scroll 38. The circular knife 36 and the scroll 38 are fastened from the rear thereof by bolts 40 to a vertical flange 42 of the knife holder 28. The knife holder 28 is also provided with a sleeve 44 which embraces the portion of the shaft 26 designated by the reference numeral 48 and is keyed thereto by the key 50. A cap 60 is disposed on the sleeve 44, and the free end of the sleeve 44 and the shoulder 64 constitute side supports for a ball-bearing 66 for the shaft 26. It is to be noted that the cap 60 is threadedly secured to a sleeve 68 which is slidably positioned in the housing 5.

The internal gear 22 is provided with a hub 70 which embraces the shaft 26 and is secured thereto by a key 72. A cap 74, similar to the cap 60 at the opposite end of the shaft, is thread-edly secured to the sleeve 68 and is positioned on the hub 70. The cap 74 and the hub 70 cooperate with the shoulder 76 in the sleeve 68 to constitute a support for the ball-bearing 78 which carries the shaft 26.

For reasons which will become apparent, it is necessary to reciprocate the rotary knife 36 and the scroll 38. As previously mentioned, the sleeve 68 is slidably carried in the housing 5, and the means for effecting the sliding movement will now be described.

As shown in Figures 5 and 6, the sleeve 68 is provided with a pair of oppositely disposed ears 80. A link 84 is secured at one end thereof to an ear 80 by a pin 82. The other end of the link 84 is connected to a leg 86 of a yoke 88 which is secured to a pivot shaft 90 which passes therethrough and is carried in spaced bearings 91 which are suspended from a support 222. It will be noted that when the pivot shaft is rotated, the movement thereof will be transmitted through the links to the sleeve 68 and cause the latter to move in the direction dictated by the direction of rotation of the pivot shaft 90.

The pivot shaft 90 is designed to be actuated through a yoke 92 which at the top thereof is loosely mounted on said pivot shaft 90, the lower end of the yoke 92 being provided with a cam 94, hereinafter more fully explained. A cam member 96 is keyed to the shaft 90 and is adjustably secured to the yoke 92. As shown in Figure 6, the cam member 96 is provided with slots 100 which cooperate with lag screws 102 carried by the yoke 92. Upon movement of the yoke 92 relative to the cam member 96, the extent of movement imparted to the pivot shaft 90 can be adjusted. The screws 102 lock the cam 96 to the yoke 92 after the desired adjustment has been made.

For facilitating the sliding of the sleeve 68 in the housing 5, the sleeve 68 is provided with a key 106 which slides in a key-way 108 in the housing 5.

The sleeve 68 is provided with an adjustable stop which, in the form shown, is a nut 109 threadedly secured thereon and which cooperates with a shoulder 110 of the housing 5 to limit the movement of the sleeve 68 and the shaft 26 in a forward direction.

A lever 112 is pivotally mounted on a pivot 114 carried by the frame. One end of the lever 112 is provided with a head 116. Intermediate the head and pivot, the lever 112 is provided with a threaded member 117 having an eye 118 in which one end of a spring 120 is positioned. The other end of the spring 120 is positioned in an eye 122 in the element 124 carried by a flange 126 of the housing 5. A nut 128 adjustably secures the threaded member 117 to the lever 112. The lever 112 below its pivot 114 is provided with a block 130 which cooperates with a boss 132 on the casting 4 to limit rearward movement of the sleeve 68 and the shaft 26. By means of the bolt 134 and the nut 136, the lever 112 may be adjusted. It is to be noted that the head 116 may, if the movement is sufficient, also engage the flange 140 of the internal gear 22. If desired, the block 130 may be moved to its outer extreme position and the end 142 of the lever 112 may be manually depressed whereby the sleeve and shaft will be moved (to the left in Figure 5) and permit easy access to the knife and holder when desired, as, for example, when the knives are to be changed.

Each rotary knife 36 is beveled, as indicated by the reference numeral 150, on the rear face thereof to form the cutting edge.

The rotary knives 36 are designed to make incisions in the back of the fish on each side of the dorsal fins, which converge upwardly in the fish. Accordingly, the housing 5, which as previously described carries the shaft 26 and drive means therefor, is mounted on an angle, as shown in Figures 4 and 5 of the drawings.

The diameter of the scroll 38 at its base is slightly less than the diameter of the front face of the cutting knife 36 on which it is disposed. Since the circular rotatable knives 36 are disposed so that they converge in an upward direction and thereby make converging incisions on opposite sides of the dorsal fins, each scroll 38 is designed, as shown in Figures 4 and 5, so that when it is positioned and secured in operative position as described, the passage 156 formed between the two faces of the scrolls in opposed relationship just below the high point of the knives will be substantially vertical. With this in view, each scroll 38 is made in the general shape of a frustum of a shallow cone provided with a central aperture whereby it can be seated on the flange 32 of the knife holder, as shown in Figures 4 and 5. In other words, the front face of each scroll tapers downwardly from the central aperture thereof. The inclined face of each scroll 38 is provided with a spiral rib 160, the successive spirals being spaced and thereby forming a helical groove or passageway 162, which is provided with a plurality, such as four or more, of lead-ins 164 positioned equidistantly around the periphery. Except for the portion of the spiral rib 160 which forms the lead-ins 164, the remainder thereof is of the same height. Preferably, the spiral rib is tapered so as to provide a cutting edge. The helical groove 162 is of a width sufficient to accommodate a fin knuckle. It is to be noted that each scroll 38 is provided with a concentric projection 165 which serves to prevent the ribbon of flesh or skin, or any part thereof, from passing between the scrolls 38.

A decapitated fish, tail leading, is fed through the zone of action of the rotary knives of the scroll associated therewith. Various means for positioning the fish and feeding it through the apparatus which constitutes this invention may be utilized. An illustrative mechanism for these purposes will now be described.

At 203 is a shaft extending transversely of the bed or frame and journaled in suitable bearings mounted on the side members but not shown. Mounted on the shaft are two pairs of sprockets 204 over which the endless chains 207 pass. As will be seen from Figure 4, there are two pairs of these chains 207 which extend substantially horizontally from the sprockets 204 to another set of sprockets toward the left in Figure 1, but not shown. The shaft 203 may be rotated from any suitable power source in any desired manner.

Mounted on each pair of chains 207, and transversely aligned, are a pair of blocks or carriers 208 which in detailed construction are somewhat similar to those illustrated in United States Patent No. 2,149,021. The blocks or carriers are provided with side extensions 205 which are attached at their terminal extensions to the chain pairs, as will be seen particularly in Figure 4. These side extensions terminate in spaced relation to the main body portion of the blocks, as is clear from Figure 4, to provide a channel or passage into which spaced plates 209 pass. These plates 209 extend longitudinally of the machine, a pair on each side and vertically spaced, as is clear from Figures 1 and 4.

As shown in Figure 4, these plates are merely long strips or bars, preferably of Bakelite, positioned so that the blocks or carriers 208 may slide therealong in travelling both on the upper and lower levels of their path of travel. By this arrangement, the blocks 208 are caused to move along straight lines, and are not allowed to follow the curved path which would otherwise naturally result from the sagging of the chains. The pairs of strips 209 are supported at opposite sides of the frame and are held in proper spaced relation by means of connecting members 210 which are supported from the body of the frame by arms or brackets (not shown).

Each block or carrier 208 is provided with a channel therethrough extending transversely of the path of travel of the chains in which are reciprocally mounted bars or rods 212 which terminate in enlarged plate-like ends 215 which have a series of sharp projections 216 on the face thereof. Journaled on the opposite end of each plunger is a pair of rollers 213 and 214.

As will be seen from Figures 1 and 2, there is secured to the ends of the side members 1 a pair of curved arms or brackets 217 which extend up over the guide plates 209 and have formed on the outer edges camming surfaces 218. These camming surfaces 218 are so positioned as to be engaged by the rollers 214 as the blocks 208 swing along a curved path from the lower level to the upper level in their path of travel. Supported on the side members 1, as will be seen in Figure 4, and extending alongside the path of travel of the blocks on the lower level are camming bars 219 which are positioned to engage the rollers 214 throughout their path of travel along the lower level. Extending along the sides of the machine and parallel to the upper level of travel of the blocks are angle irons 222, the inner faces of which act as camming surfaces for the rollers 213. At the initial ends of the angle bars 222 are cam plates 221 which have curved camming edges 221a which merge into the camming surfaces of the angle irons. The adjacent portions of the camming surfaces 218 of the curved arms 217 are similarly curved, as shown at 217a. It is to be noted that the roller 214 passes in the passage formed between the cams 217a and 221a before the roller 213 engages the inner face of the angle bar 222.

At 223 is a supply chute or guide upon which the fish is placed for introduction into the machine, back downward and tail leading. Pivotally mounted on the sides of the chute are a pair of gates 224 which swing on vertical pivot pins 225 supported from the sides of the curved arms 217.

As is clear from Figure 1, a pair of coiled springs 226 are provided and arranged so as to cause the gates 224 to converge in the direction of movement of a fish as it passes therebetween. It is to be noted that any suitable form of gate construction may be used.

Extending between the side frames is a brace 230 which is positioned to support the forward end of the trough 223 and to pivotally support at 231 a yoke 232 upon which is mounted a dorsal fin straightener 233. The construction of this straightener and guide is illustrated and described in full detail in United States Patent No. 2,149,021.

A grooved roller 250 is rotatably mounted in a forked member 252 mounted on a rod 254 which is pivoted at 256 to a standard 258 mounted on the frame of the machine. The roller 250 is designed to engage the top of the fish (belly portion) and maintain it in position as it passes through the cutting zone of the rotary knives. Due to the irregularity in the form and shape of the various fish subjected to the treatment, the roller 250 will be raised and lowered. In order to cushion the drop of the roller, there is provided a cup 260 mounted on a suitable upright 262 carried on the frame of the machine. A rubber pad 264 is positioned in the cup and is adapted to be engaged by a flat member 266 secured by a screw 268 to the member 270 carried on the rod 254.

In order to prevent the roller 250 from contacting the blocks 208, there is provided a cam member 280 which is pivoted at 283 on the standard 258. The cam 280 is provided with a vertically extending arm 284 which terminates slightly below the arm 254. Thus, when the cam 280 is raised, the arm 284 will engage the rod 254 and thereby elevate the roller. Means are provided to permit the arm 284 to move laterally when the cam 280 is rotated about the pivot 282. As shown, the arm 284 is provided with a pad 286 having a vertical slot 288. A bolt 290 extends through the vertical slot 288 and also through a horizontal slot 292 in an ear 294 carried by the standard 262. A similar roller construction is provided beyond the cutting knives so as to maintain the fish in position.

In operation, a decapitated fish, back downward and tail leading, is introduced into the trough 223 through which it is fed and maintained in vertical position. As the tail of the fish leaves the trough 223, it is gripped on both sides thereof by the plate-like ends 215 and conveyed through the machine. The fins of the fish are straightened by the fin straightener 233 and, while in this straightened position, the fish is fed through the zone of action of the circular cutting knives 36. At this stage the cutting knives are spaced at the top thereof a distance sufficient to permit the tail to pass therethrough. After the tail of the fish has passed therebetween, the yoke 92 is actuated and the motion thereof is transmitted to the sleeve, from which it is transmitted to the shaft 26 to move the rotary knives toward each other for a slight distance and sufficient to make shallow converging incisions on opposite sides of and close to the fin knuckles. At the time the knives are moved toward each other, the scrolls 38 mill the skin on the strip defined by the incisions. The free end of the strip is then seized and held by the scrolls (see Figure 9). As the rotary knives and scrolls rotate, the free end of the strip passes through one of the lead-ins into the helical groove. Continued rotation causes the strip held by the scrolls to move downwardly. The downward movement of the strip imposes a pull (downward tension) thereon, which tension is continuously maintained until the knives reach the end of the decapitated end of the fish, at which time the strip will be removed from the fish. It is to be noted that as the strip is fed downwardly by the helical grooves, each dorsal fin knuckle is received in the helical grooves and also fed downwardly and maintained under tension. At the time that the flesh strip together with the associated fin knuckles are removed from the fish, the yoke 92 is actuated and the motion thereof transmitted to the sleeve, which motion is transmitted to the shaft and the knives and scrolls retracted to the original position, and the cycle is repeated with each fish.

The yoke 92 is actuated through the cam 94 by the roller 213 of the grippers, the cam 94 being of a contour to impart the desired movements to the yoke 92. During this operation, the roller 214 is in engagement with the camming bar 219. The carriers 208 are positioned at such positions on the chains and the speeds of the chains are so selected that the aforementioned operations can be effected. It is to be understood that the yoke 92 may be actuated at predetermined times by means other than those carried by the carriers 208.

Since it is obvious that various changes and modifications may be made in the above description without departing from the nature or spirit thereof, this invention is not restricted thereto except as set forth in the appended claims.

I claim:
1. A method of treating fish which comprises advancing a decapitated fish, tail leading and back downward, along a defined path of travel, making a pair of incisions in the back on opposite sides of the dorsal fins as the fish is travelling, severing the skin transversely of the incisions, thereafter gripping the free end of the strip defined by the incisions, imposing a downward tension on said strip, and maintaining said tension on said strip until the incisions reach the decapitated end of the fish, whereby said strip together with the dorsal fins and associated knuckles are removed.

2. A method of treating fish which comprises advancing a decapitated fish, tail leading and back downward, along a defined path of travel, making a pair of incisions in the back on opposite sides of the dorsal fins as the fish is travelling, severing the skin transversely of the incisions, thereafter gripping the free end of the strip defined by the incisions, and continuously pulling the strip downwardly until the incisions reach the decapitated end of the fish, whereby said strip together with the dorsal fins and associated knuckles are removed.

3. In a machine for treating fish wherein a decapitated fish is fed, tail leading and back downward, means for making incisions along the back of the fish on opposite sides of the dorsal fins, means to sever the skin between the incisions, means to seize an end of the strip defined by the incisions, and means to continuously feed said end downwardly until the dorsal fins and associated knuckles are removed.

4. In a machine for treating fish wherein a decapitated fish is fed, tail leading and back downward, a pair of rotating circular knives, means to angularly position said knives to make incisions on opposite sides of the dorsal fins in the back of a fish fed thereover, means to sever the skin between the incisions, means to seize an end of the strip defined by the incisions, and means to continuously feed said end downwardly until the dorsal fins and associated knuckles are removed.

5. In a machine for treating fish wherein a decapitated fish is fed, tail leading and back downward, a pair of circular rotating knives, means to angularly position said knives to make incisions on opposite sides of the dorsal fins in the back of a fish fed thereover, and means on each of the opposed faces of said knives, the free face of said means being tapered in a downward direction from the center thereof and provided with means to seize and continuously pull the strip defined by the incisions downwardly.

6. In a machine for treating fish wherein a decapitated fish is fed, tail leading and back downward, a pair of circular rotating knives, means to angularly position said knives to make incisions on opposite sides of the dorsal fins in the back of a fish fed thereover, and means on each of the opposed faces of said knives, the free face of said means being tapered in a downward direction from the center thereof and provided with means to seize and continuously pull the strip defined by the incisions downwardly, the taper of each of said faces being such that adjacent the high point of the knives said face will be in a substantially vertical position.

7. In a machine for treating fish wherein a decapitated fish is fed, tail leading and back downward, a pair of circular rotating knives, means to angularly position said knives to make incisions on opposite sides of the dorsal fins in the back of a fish fed thereover, and a frusto-conically shaped scroll having its base disposed on the inner face of each knife, said scroll having a spiral rib and a helical groove therebetween.

8. In a machine for treating fish wherein a decapitated fish is fed, tail leading and back downward, a pair of circular rotating knives, means to angularly position said knives to make incisions on opposite sides of the dorsal fins in the back of a fish fed thereover, and a frusto-conically shaped scroll having its base disposed on the inner face of each knife, said scroll having a spiral rib and a helical groove therebetween, said groove being provided with a plurality of lead-ins.

9. In a machine for treating fish wherein a decapitated fish is fed, tail leading and back downward, a pair of circular rotating knives, means to angularly position said knives to make incisions on opposite sides of the dorsal fins in the back of a fish fed thereover, and a frusto-conically shaped scroll having its base disposed on the inner face of each knife, said scroll having a spiral rib and a helical groove therebetween, the taper of said scroll being such that adjacent the high points of the knives the ribbed surface will be in a substantially vertical position.

10. In a machine for treating fish wherein a decapitated fish is fed, tail leading and back downward, a pair of circular rotating knives, means to angularly position said knives to make incisions on opposite sides of the dorsal fins in the back of a fish fed thereover, and a frusto-conically shaped scroll having its base disposed on the inner face of each knife, said scroll having a spiral rib and a helical groove therebetween, said groove being provided with a plurality of lead-ins, the taper of said scroll being such that adjacent the high points of the knives the ribbed surface will be in a substantially vertical position.

11. In a machine for treating fish wherein a decapitated fish is fed, tail leading and back downward, a pair of circular rotating knives, means to angularly position said knives to make incisions on opposite isdes of the dorsal fins in the back of a fish fed thereover, a frusto-conically shaped scroll having its base disposed on the inner face of each knife, said scroll having a spiral rib and a helical groove therebetween, and means to secure said scroll and said knife together from the back thereof, whereby the ribbed surface will be free.

12. A fish treating machine comprising a pair of oppositely disposed shafts, means to support each shaft so that the longitudinal axis thereof is at an angle to the horizontal, a circular knife positioned on each of the opposing ends of said shafts whereby said knives will make incisions on opposite sides of the dorsal fins in the back of a fish fed thereover, a frusto-conically shaped scroll having its base disposed on the inner face of each of said knives, said scroll having a spiral rib and a helical groove, an internal gear secured to the other end of each of said shafts, and a motor having a gear on its shaft cooperating with said internal gear to drive said shaft.

13. A fish treating machine comprising a pair of oppositely disposed shafts, a sleeve on each shaft, means transmitting sliding movement of each of said sleeves to its respective shaft, a housing for each sleeve, each housing being splined to a sleeve and positioned so that the longitudinal axis thereof is at an angle to the horizontal, a circular knife positioned on each of the opposing ends of said shafts where said knives will make incisions on opposite sides of the dorsal fins in the back of a fish fed thereover, a frusto-conically shaped scroll having its base disposed on the inner face of each of said knives, said scroll having a spiral rib and a helical groove, an internal gear secured to the other end of each of said shafts, a motor having a gear on its shaft cooperating with said internal gear to drive said shaft, and means to impart sliding movement to said sleeve at predetermined periods of time.

CHARLES M. SAVRDA.